Oct. 10, 1967  G. A. DOTTO  3,345,998

SAFETY CHECK VALVE

Filed Feb. 19, 1965  3 Sheets-Sheet 1

INVENTOR
GIANNI A. DOTTO
BY
Robert Levine
ATTORNEY

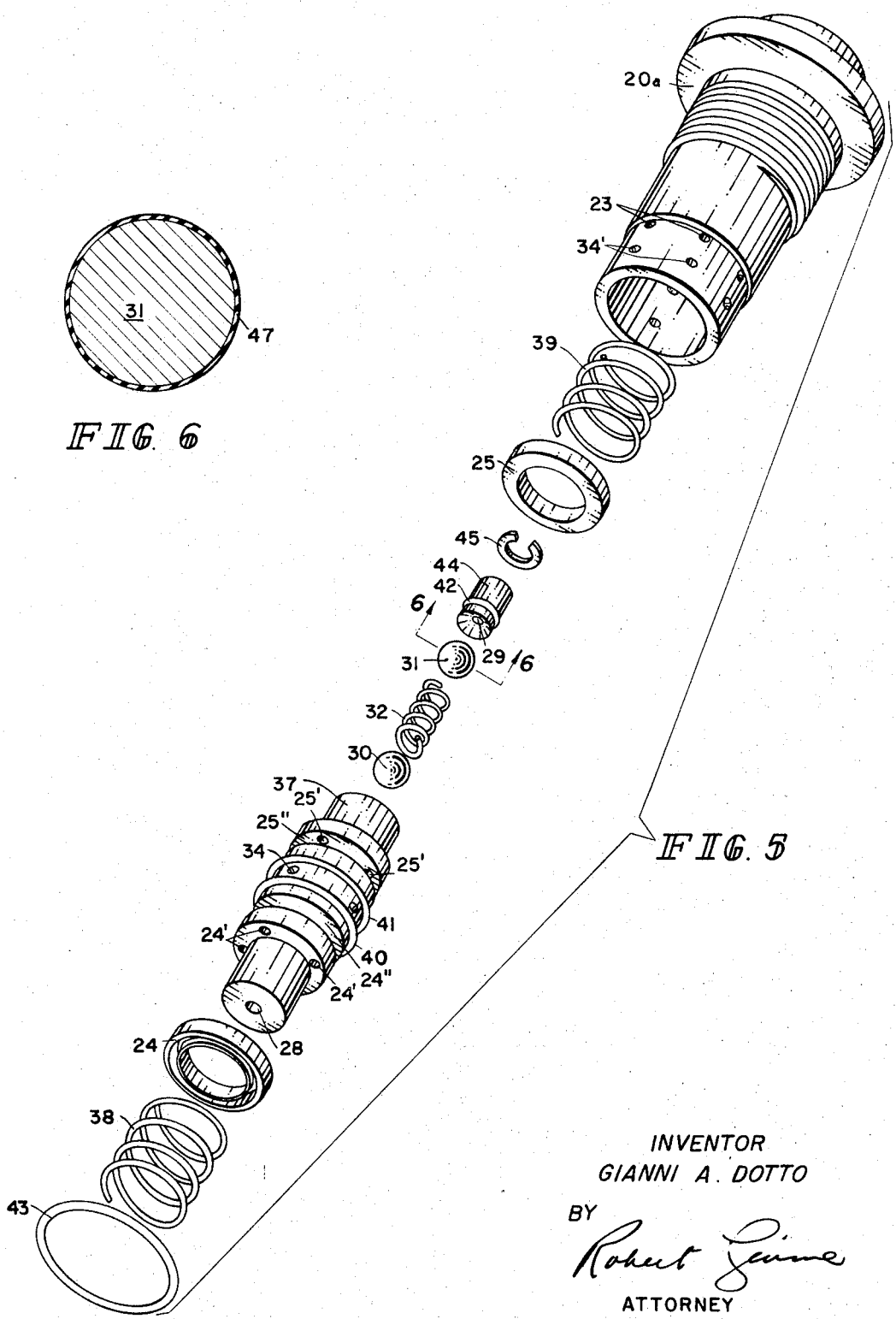

3,345,998
SAFETY CHECK VALVE
Gianni A. Dotto, 3005 Claar Ave.,
Dayton, Ohio 45429
Filed Feb. 19, 1965, Ser. No. 433,912
6 Claims. (Cl. 137—118)

ABSTRACT OF THE DISCLOSURE

A safety valve device restored to a normal position upon bleeding of repaired brake lines without the necessity of requiring disassembly and the use of special tools to restore a displaceable safety valve to its initial position.

---

Figure 1:
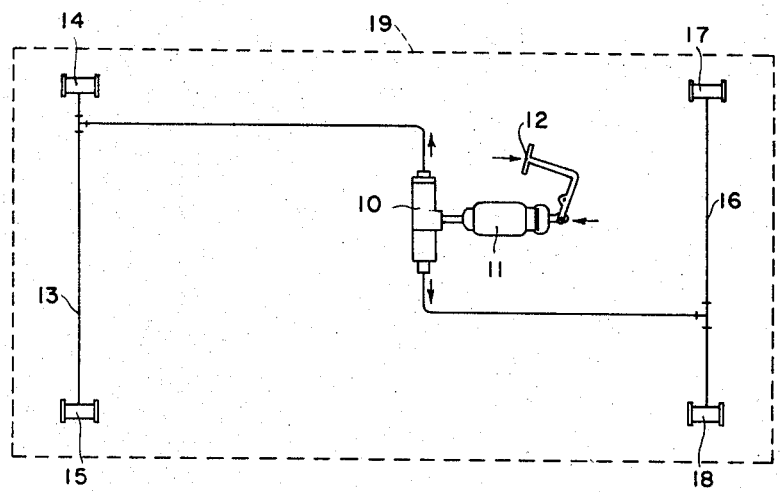

The present invention relates to a vehicle brake system, and more particularly relates to a safety valve interposed between the master cylinder and the brake lines which maintains the pressure in one brake line if a leak occurs in the second line.

In conventional braking systems a single master cylinder is provided with a pressure chamber in which pressure is generated by pedal pressure or by a booster motor to apply the brake. The pressure chamber has a single fluid outlet provided with conduits branching to apply hydraulic fluid under pressure to all of the wheel cylinders. If a break occurs at any point in the conduit, all of the braking pressures are lost to all of the vehicle wheels. Therefore, there is a need for a safety means whereby a leak in any point in the conduit does not result in a loss of braking pressure to all of the vehicle wheels.

There are a number of devices known in the art which provide some measure of safety should a leak occur in one conduit. One means for providing an improved braking device comprises a novel master cylinder wherein a single hydraulic cylinder is provided with a pair of novel fluid displacing plungers, one of which displaces fluid to the front wheel cylinders and the other to the rear wheel cylinders, so that upon the rupturing of one of the lines leading to one set of wheel cylinders, the other set may be operated by its associated master cylinder piston so that one set of brakes remains operable. This is accomplished by fabricating a two-chamber master cylinder having the pair of fluid-displacing plungers adjacent the lower wall of the cylinder. While this device is satisfactory, it is a relatively expensive device and does not lend itself to installation in cars having conventional master cylinder constructions.

A second type of safety device known in the art is a safety valve which is interposed between the master cylinder and the brake lines. The safety valves allow fluid to pass to and from the master cylinder as long as there are no leaks in the lines. Should one brake line develop a leak, the safety valves serve to seal off the broken line and allow the other line to remain operative. One of the more recent of these devices comprises a pair of dual chambers connected at more than one point and having pistons in each chamber so that as long as the system is balanced the dual pistons will travel downwardly to a certain point and will thereafter operate independently of each other for the purpose of controlling the supply in either line. At the bottom wall of each of the chambers there are outlets for allowing the fluid to travel to the brake lines. The brake line conduits have spring-loaded ball valves attached to each extremity of the conduit, the ball valves being operated by a rubber sealing gasket. Should a leak develop in one line the unbalanced pressure forces both ball valves in the direction of the break so as to seal the broken conduit. However, this device does not provide positive sealing means and although it is stated in the specification that the ball will remain wedged into the opening so long as there is a leak, it appears from the construction that the leakage around the pistons will cause sufficient pressure between the rubber sealing gasket and the outlet port so as to supply sufficient pressure therebetween to possibly balance the pressure and break the seal. A further disadvantage of the device is that when a rupture has been repaired the safety valve must be restored to normal by manual methods, that is by inserting an elongated pin or nail into the piston seating to unseat the piston. This entails removing the safety valve from the brake line with no assurance that the valve may be restored to normal or that it will not maintain damage during restoration.

Therefore it is an object of the present invention to provide an improved safety valve for vehicle brake systems.

It is an object of the present invention to provide a safety check valve which overcomes the disadvantages of prior art.

It is an object of the present invention to provide a safety check valve which is restored to normal position upon bleeding of the brake lines after repairing the leak.

It is an object of the present invention to provide a safety check valve having a positive sealing means which will retain its unbalanced position and thus maintain a seal until the broken line is repaired.

The invention in another of its aspects relates to novel features of the instrumentalities described herein for teaching the principal object of the invention and to the novel principles employed in the instrumentalities whether or not these features and principles may be used in the said object or in the said field.

Other objects of the invention and the nature thereof will become apparent from the following description considered in conjunction with the accompanying drawings and wherein like reference numbers describe elements of similar function therein and wherein the scope of the invention is determined from the dependent claims.

Figure 2:
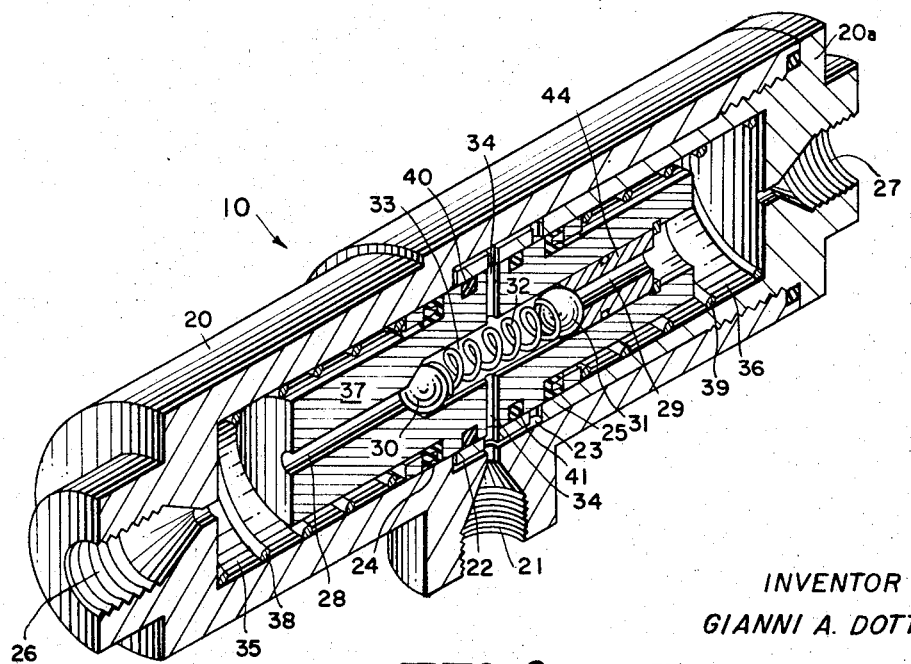
Figure 3:
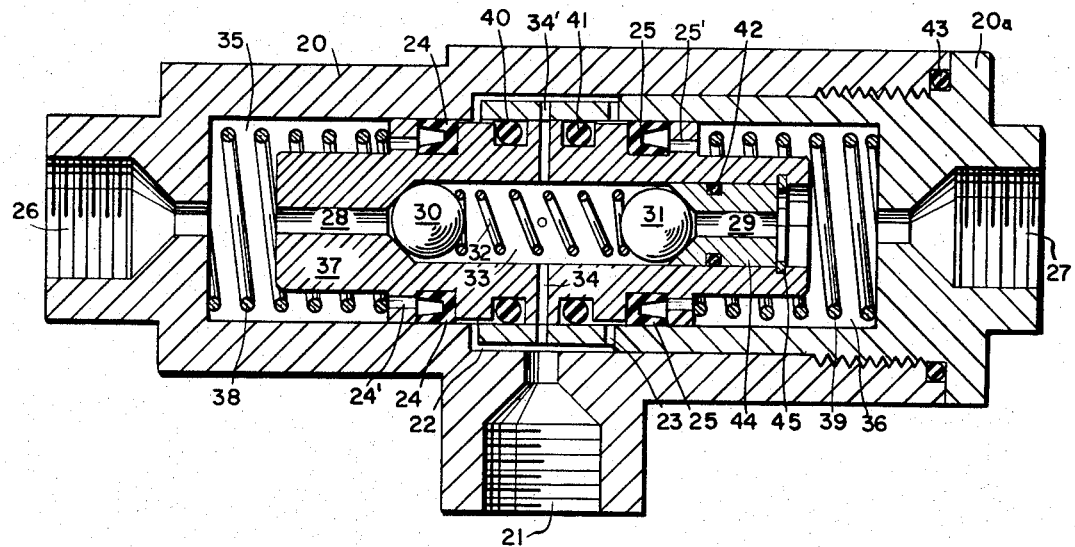
Figure 4:
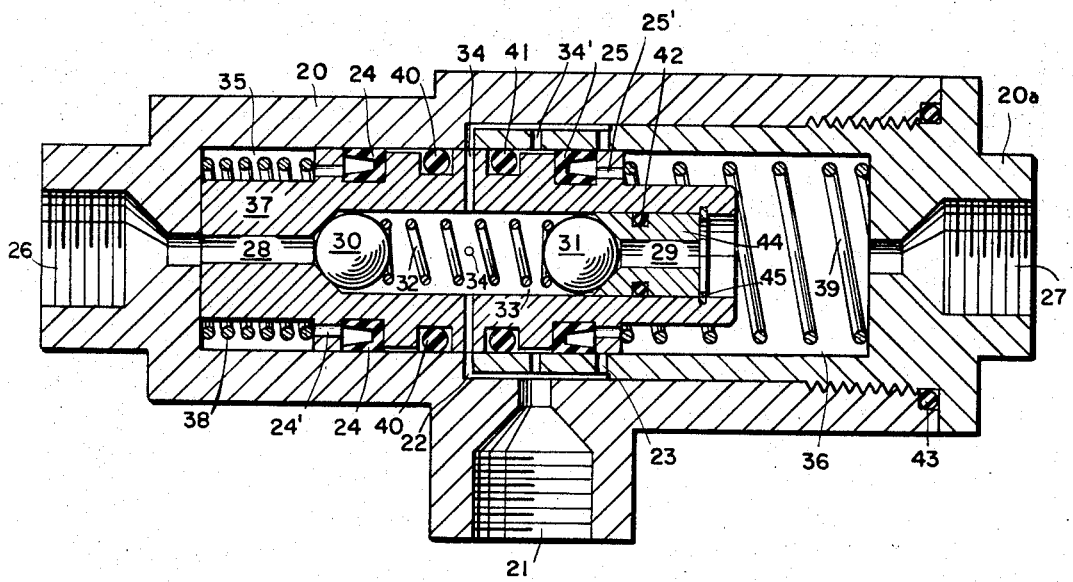

Referring now to the drawings:
FIGURE 1 is a schematic perspective view showing the device installed in conjunction with the hydraulic brake system of a vehicle;
FIGURE 2 is a sectional perspective view of the safety check valve;
FIGURE 3 is a sectional view of the safety check valve illustrating the position of the component parts in normal condition;
FIGURE 4 is a sectional view of the safety check valve illustrating the position of the component parts upon failure of one brake line;
FIGURE 5 is an exploded view of the safety check valve; and
FIGURE 6 is a sectional view of the one-way ball valve.

Generally speaking the present invention provides a safety valve which substantially provides two separate brake units, front and rear. The safety valve is connected to the master cylinder, front brake line and rear brake line. When pressure is applied to the brake pedal, brake fluid travels from the master cylinder to the valve. The fluid travels through one-way valves and through conduits which feed fluid to the brake line outlets. When the pressure is released, the fluid returns through the brake line outlets and opens another set of one-way valves leading into a passage which releases the back pressure to the master cylinder. As long as the pressure is equal in the two chambers which feed the front and rear brake lines, the central piston unit containing the spring loaded return valves remain in the center of the device. However, if a leak develops in one line, the pressure immediately becomes unequal and the piston unit shifts toward the broken line and seals both the inlet and outlet passages for that line. The piston does not return to the center position until the damaged line has been repaired. Upon bleeding of the system, the piston automatically moves back to the center position and normal operation is reestablished. The safety valve provides a means for maintaining a certain amount of braking power in any motor vehicle if damage occurs to one of the two brake lines.

For a fuller understanding of the device, reference is now made to the drawings.

In FIGURE 1, the safety valve, generally designated by the numeral 10, is shown positioned in association with the hydraulic braking system of a vehicle 19 so as to prevent loss of braking fluid between the master cylinder 11 and a plurality of brake drums 14, 15, 17 and 18 and which connects master cylinder 11 with front and rear brake lines 16 and 13 respectively, with the usual foot pedal 12 being employed to actuate the master cylinder 11.

Referring to FIGURE 2, inlet 21 of valve housing 20 is connected to the master cylinder 11 (FIGURE 1). When pressure is applied to the master cylinder, the brake fluid flowing through inlet 21 passes through passages 22 and 23, through open one-way valves 24 and 25 and feeds through apertures 26 and 27 to the rear and front wheel brake lines respectively. When the pressure is released, the fluid returns through apertures 26 and 27 and passes through conduits 28 and 29. The fluid pressure in conduits 28 and 29 displaces spring-maintained, one-way ball valves 30 and 31, thereby allowing the fluid to flow into chamber 33 and from there, to return to the master cylinder via outlet passage 34.

As long as the pressure is equal in chambers 35 and 36 respectively, piston 37 is maintained at a center position by springs 38 and 39, as is clearly shown in FIGURE 3. O-rings 40 and 41 prevent the brake fluid from backing up during the return cycle.

If one line becomes damaged, the line pressure drops and thus the pressure on springs 38 and 39 becomes unequal. If, as in FIGURE 4, a leak develops in the rear brake line the pressure in chamber 36 becomes greater than the pressure in chamber 35 and the slidably mounted piston 37 is forced toward chamber 35. Rubber O-ring 40 causes the fluid to bypass passage 35, and one-way valve 24 becomes inoperative. Thus the fluid is trapped by O-ring 40 and one-way check valve 30. Should the break occur in the front line, the piston would have moved adjacent port 27.

As long as one line is damaged, the free floating piston 37 will not return to the center position shown in FIGURE 3 because of the residual pressure in the master cylinder which maintains the differential pressure and thus stoppage of leakage is insured, whereas, in the Margida device, fluid is allowed to reach the valve portion associated with the broken line at each application of the brake pedal, and the probability of leakage is high.

For a fuller understanding of safety valve 10, an exploded view, FIGURE 5, has been provided. As is seen in FIGURES 2, 3 and 4 the valve housing 20 has end portion 20a which threadably engages housing 20 so that the valve assembly may be positioned in housing 20. O-ring 43 fits at one end of housing 20a to provide a tight seal between parts 20 and 20a. Spring 39 is loaded into chamber 20a to provide tension for piston 37. One-way valve 25, which is a V-block, prevents braking fluid from returning any way but through chamber 33 (FIGURE 3). Expansion C-ring 45 provides a seal for plug 44 when back pressure is applied. Plug 44 has aperture 29 therethrough for the return of brake fluid into chamber 33 (FIGURE 3). One-way ball valves 31 and 33 are held apart by tension spring 32 so that when the brake fluid enters the safety valve from the master cylinder, fluid cannot reach ports 28 and 29 through chamber 33. When the brake fluid returns from the brake lines, V-blocks 25 and 24 prevent the fluid from entering ports 24' and 25'. The brake fluid must travel through ports 28 and 29 and the back pressure displaces valves 30 and 31, allowing the fluid to enter chamber 33 and return to the master cylinder. V-blocks 24 and 25 are positioned in V-block channels 24" and 25" on piston 37. Spring 38 provides tension to centrally locate piston 37 along with spring 39 so that when the back pressures are equal, piston 37 is centrally located in housing 20. When the valve is assembled, center bore 34 in valve 37 is aligned with center bore 34' in housing 20a. Ports 23 in portion 20a are fluid inlet ports. O-rings 40 and 41 seal their respective channels if a break occurs so that no fluid reaches the one-way seals 24 or 25.

As can be seen in FIGURE 6, ball valves 31 and 33 are rubber coated so as to provide the best seal possible.

Since many widely differing embodiments of the invention may be made without departing from the scope thereof, it is intended that all matter contained in the above description and shown in the accompanying drawings shall be interposed as illustrative and not in a limiting sense.

Having thus described my invention, I claim:

1. A safety device for a brake system of a vehicle located between master cylinder means and front and rear brake lines comprising housing means including a bore terminating in outlet ports, one of said outlet ports adapted to communicate with a front brake line and another of said outlet ports adapted to communicate with a rear brake line, an inlet port defined by said housing, said inlet port connected to master cylinder means, valve means including a passageway terminating in ports slidably inter-fitting with said bore and adapted to define subchambers communicating with said outlet ports when said valve means is in a normal position, said valve means including first one-way valve means permitting fluid flow from said inlet port to said outlet ports through said subchambers as pressure is increased in said inlet port and second one-way valve means in said passageway normally allowing fluid flow from said subchambers into said passageway of said valve means upon reduction of pressure in said inlet port, said valve means slidably displaced into engagement with one of said outlet ports thereby terminating fluid flow therethrough upon failure of said brake line cooperatively associated therewith, displacement of said valve means storing energy so that repair of said defective brake line releases said stored energy slidably displacing said valve means to said normal position in said bore allowing fluid to flow from said inlet port to said outlet ports as pressure is increased in said inlet port.

2. A safety device for a brake system of a vehicle located between master cylinder means and front and rear brake lines comprising housing means including a bore terminating in outlet ports, one of said outlet ports adapted to communicate with a front brake line and another of said outlet ports adapted to communicate with a rear brake line, an inlet port defined by said housing, said inlet port connected to master cylinder means, biased valve means including a passageway terminating in ports slidably inter-fitting with said bore and adapted to define subchambers communicating with said outlet ports when said biased valve means is in a normal position, said biased valve means including first one-way valve means adjacent the periphery of said biased valve means permitting fluid flow from said inlet port to said outlet ports through said subchambers as pressure is increased in said inlet port and second one-way valve means seated in said passageway normally allowing fluid flow from said subchambers into said passageway of said biased valve means upon reduction of pressure in said inlet port, said biased valve means slidably displaced into engagement with one of said outlet ports thereby terminating fluid flow therethrough upon failure of said brake line cooperatively associated therewith, displacement of said biased valve means storing energy so that repair of said defective brake line releases said stored energy slidably displacing said biased valve means to said normal position in said bore allowing fluid to flow from said inlet port to said outlet ports as pressure is increased in said inlet port.

3. A safety device for a brake system of a vehicle located between master cylinder means and front and rear brake lines comprising housing means including a bore terminating in outlet ports, one of said outlet ports adapted to communicate with a front brake line and another of said outlet ports adapted to communicate with a rear brake line, an inlet port defined by said housing, said inlet port connected to master cylinder means, biased valve means including a passageway connected to center bore means and terminating in ports slidably inter-fitting with said bore of said housing and adapted to define subchambers communicating with said outlet ports, bias means including spring means seated in said subchambers between said outlet ports and said valve means biasing said valve means to a normal position in said bore of said housing, said biased valve means including first one-way valve means adjacent the periphery of said biased valve means permitting fluid flow from said inlet port to said outlet ports through said subchambers as pressure is increased in said inlet port and second one-way valve means seated in said passageway normally allowing fluid flow from said subchambers into said passageway and through said center bore means of said biased valve means to said inlet port upon reduction of pressure in said inlet port, said biased valve means slidably displaced into engagement with one of said outlet ports thereby terminating fluid flow therethrough upon failure of said brake line cooperatively associated therewith, displacement of said biased valve means storing energy so that repair of said defective brake line releases said stored energy slidably displacing said biased valve means to said normal position in said bore of said housing allowing fluid flow from said inlet port to said outlet ports as pressure is increased in said inlet port.

4. A safety device for a brake system of a vehicle located between master cylinder means and front and rear brake lines comprising housing means including a bore terminating in outlet ports, one of said outlet ports adapted to communicate with a front brake line and another of said outlet ports adapted to communicate with a rear brake line, an inlet port defined by said housing, said inlet port connected to master cylinder means, biased valve means including a passageway connected to center bore means and terminating in ports slidably inter-fitting with said bore of said housing and adapted to define subchambers communicating with said outlet ports, bias means including spring means seated in said subchambers between said outlet ports and said valve means biasing said valve means to a normal position in said bore of said housing, said biased valve means including first one-way valve means including at least one substantially V-block shaped one-way valve means cooperatively associated with each subchamber and adjacent the periphery of said biased valve means permitting fluid flow from said inlet port to said outlet ports through said subchambers as pressure is increased in said inlet port and second one-way valve means seated in said passageway normally allowing fluid flow from said subchambers into said passageway and through said center bore means of said biased valve means to said inlet port upon reduction of pressure in said inlet port, said biased valve means slidably displaced into engagement with one of said outlet ports thereby terminating fluid flow therethrough upon failure of said brake line cooperatively associated therewith, displacement of said biased valve means storing energy so that repair of said defective brake line releases said stored energy slidably displacing said biased valve means to said normal position in said bore of said housing allowing fluid to flow from said inlet port to said outlet ports as pressure is increased in said inlet port.

5. A safety device for a brake system of a vehicle located between master cylinder means and front and rear brake lines comprising housing means including a bore terminating in outlet ports, one of said outlet ports adapted to communicate with a front brake line and another of said outlet ports adapted to communicate with a rear brake line, an inlet port defined by said housing, said inlet port connected to master cylinder means, biased valve means including a passageway connected to center bore means and terminating in equalization ports slidably inter-fitting with said bore of said housing and adapted to define subchambers communicating with said outlet ports, bias means including spring means seated in said subchambers between said outlet ports and said valve means biasing said valve means to a normal position in said bore of said housing, said biased valve means including first one-way valve means including at least one substantially V-block shaped one-way valve means cooperatively associated with each subchamber and adjacent the periphery of said biased valve means permitting fluid flow from said inlet port to said outlet ports through said subchambers as pressure is increased in said inlet port and second one-way valve means seated in said passageway and biased against said equalization ports thereby normally closing said passageway, said second one-way valve means biased open normally allowing fluid flow from said subchambers into said passageway and though said center bore means of said biased valve means to said inlet port upon reduction of pressure in said inlet port, said biased valve means slidably displaced into engagement with one of said outlet ports thereby terminating fluid flow therethrough upon failure of said brake line cooperatively associated therewith, displacement of said biased valve means storing energy so that repair of said defective brake line releases said stored energy slidably displacing said biased valve means to said normal position in said bore of said housing allowing fluid to flow from said inlet port to said outlet ports as pressure is increased in said inlet port.

6. A safety device for a brake system of a vehicle located between master cylinder means and front and rear brake lines comprising housing means including an axial bore terminating in outlet ports, one of said outlet ports adapted to communicate with a front brake line and another of said outlet ports adapted to communicate with a rear brake line, an inlet port defined by said housing, said inlet port connected to master cylinder means, spring biased valve means including an axial passageway connected to center bore means and terminating in equalization ports slidably inter-fitting with said bore of said housing adapted to define subchambers communicating with said outlet ports, spring means including coil spring means seated in said subchambers between said outlet ports and said valve means biasing said valve means to a normal position in said bore of said housing, said biased valve means including at least one resilient and substantially V-block shaped one-way valve means cooperatively associated with each subchamber adjacent the periphery of said biased valve means permitting fluid flow from said inlet port to said outlet ports through said subchambers as pressure is increased in said inlet port and one-way ball valve means seated in each extremity of said passageway and biased against said equalization ports by spring means thereby normally closing said passageway, said one-way ball valve means biased open allowing fluid flow from said subchambers into said passageway and through said center bore means of said spring biased valve means to said inlet port upon reduction of pressure in said inlet port, said spring biased valve means slidably displaced into engagement with one of said outlet ports thereby terminating fluid flow therethrough upon failure of said brake line cooperatively associated therewith, displacement of said spring biased valve means storing energy so that repair of said defective brake line releases said stored energy slidably displacing said spring biased valve means to said normal position in said bore of said housing allowing fluid to flow from said inlet port to said outlet ports as pressure is increased in said inlet port.

References Cited

UNITED STATES PATENTS

| 1,936,504 | 10/1933 | Foster | 303—84 |
| 1,967,383 | 7/1934 | Turgot | 137—118 |
| 2,854,016 | 9/1958 | Margida | 137—118 |
| 2,944,856 | 7/1960 | Swanson | 137—118 |
| 2,965,730 | 12/1960 | Regoli | 303—84 |

WILLIAM F. O'DEA, *Primary Examiner.*

W. H. WRIGHT, *Assistant Examiner.*